United States Patent
Cortese

(10) Patent No.: US 8,800,429 B2
(45) Date of Patent: Aug. 12, 2014

(54) PERCOLATING MACHINE FOR PRODUCING A BEVERAGE USING A SEALED CAPSULE OF ANHYDROUS POWDERED MATERIAL

(75) Inventor: Virginio Cortese, Turin (IT)

(73) Assignee: Lavazza S.p.A., Turin (IT)

( * ) Notice: Subject to any disclaimer, the term of this patent is extended or adjusted under 35 U.S.C. 154(b) by 1680 days.

(21) Appl. No.: 11/631,026

(22) PCT Filed: Jun. 23, 2005

(86) PCT No.: PCT/EP2005/052952
§ 371 (c)(1),
(2), (4) Date: Jan. 10, 2008

(87) PCT Pub. No.: WO2006/003116
PCT Pub. Date: Jan. 12, 2006

(65) Prior Publication Data
US 2008/0134901 A1    Jun. 12, 2008

(30) Foreign Application Priority Data

Jun. 29, 2004 (IT) .............................. TO2004A0442

(51) Int. Cl.
*A47J 31/00* (2006.01)

(52) U.S. Cl.
USPC ................. 99/279; 99/275; 99/295; 99/300; 99/329 R; 99/289 T; 99/289 R; 99/289 D; 99/286; 426/77; 426/112; 426/431

(58) Field of Classification Search
CPC ........... A47J 31/44; A47J 31/00; A47J 31/06; A47J 31/4464; A47J 31/369; A47J 31/0673
USPC .......... 99/295, 300, 32 R, 32 P, 289 T, 289 R, 99/279, 285, 287, 293, 286; 426/433, 77, 426/112, 431
See application file for complete search history.

(56) References Cited

U.S. PATENT DOCUMENTS

| | | | | |
|---|---|---|---|---|
| 3,403,617 A * | 10/1968 | Lampe | ............................ | 99/295 |
| 5,634,394 A * | 6/1997 | Cortese | ........................ | 99/295 |
| 5,656,316 A * | 8/1997 | Fond et al. | .................... | 426/433 |
| 5,826,492 A | 10/1998 | Fond et al. | | |
| 6,827,003 B2 * | 12/2004 | Versini | ............................ | 99/287 |
| 2003/0070554 A1 * | 4/2003 | Cortese | ........................ | 99/279 |
| 2003/0217643 A1 | 11/2003 | Masek et al. | | |
| 2003/0217644 A1 * | 11/2003 | Jarisch et al. | ................... | 99/279 |
| 2004/0079237 A1 * | 4/2004 | Denisart | ....................... | 99/275 |

* cited by examiner

*Primary Examiner* — Dana Ross
*Assistant Examiner* — Brett Spurlock
(74) *Attorney, Agent, or Firm* — Ladas & Parry LLP

(57) ABSTRACT

A percolating machine for producing a beverage using a sealed capsule containing anhydrous powdered material, the machine having a pressurized-hot-water dispenser assembly extending along a vertical axis, and in turn having a sprinkler having an end wall substantially crosswise to the aforementioned axis; a removable percolating cup positioned, in use, with its inlet facing the end wall, and for housing a sealed capsule positioned with a sealing wall facing the end wall; and a piercing device integral with the sprinkler and having a number of substantially rectangular-based projections, which extend downwards from the end wall of the sprinkler, are equally spaced about the aforementioned axis along a peripheral portion of the end wall, and pierce the sealing wall of the sealed capsule when the percolating cup is set to a work position contacting the sprinkler.

11 Claims, 3 Drawing Sheets

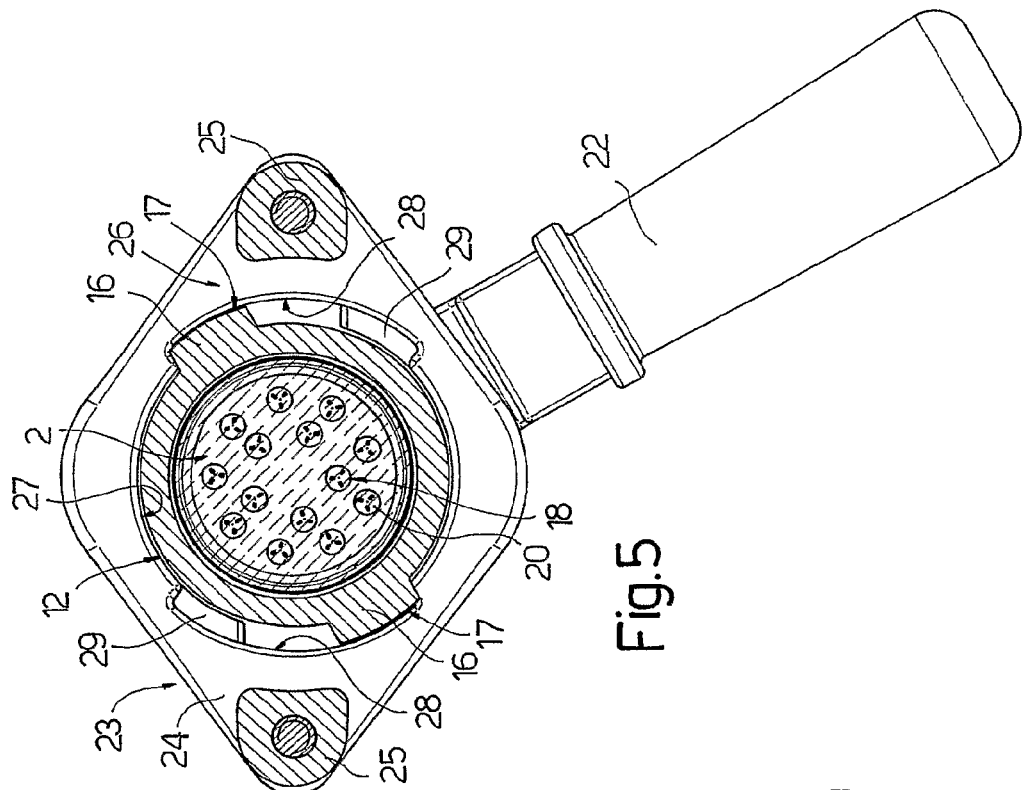
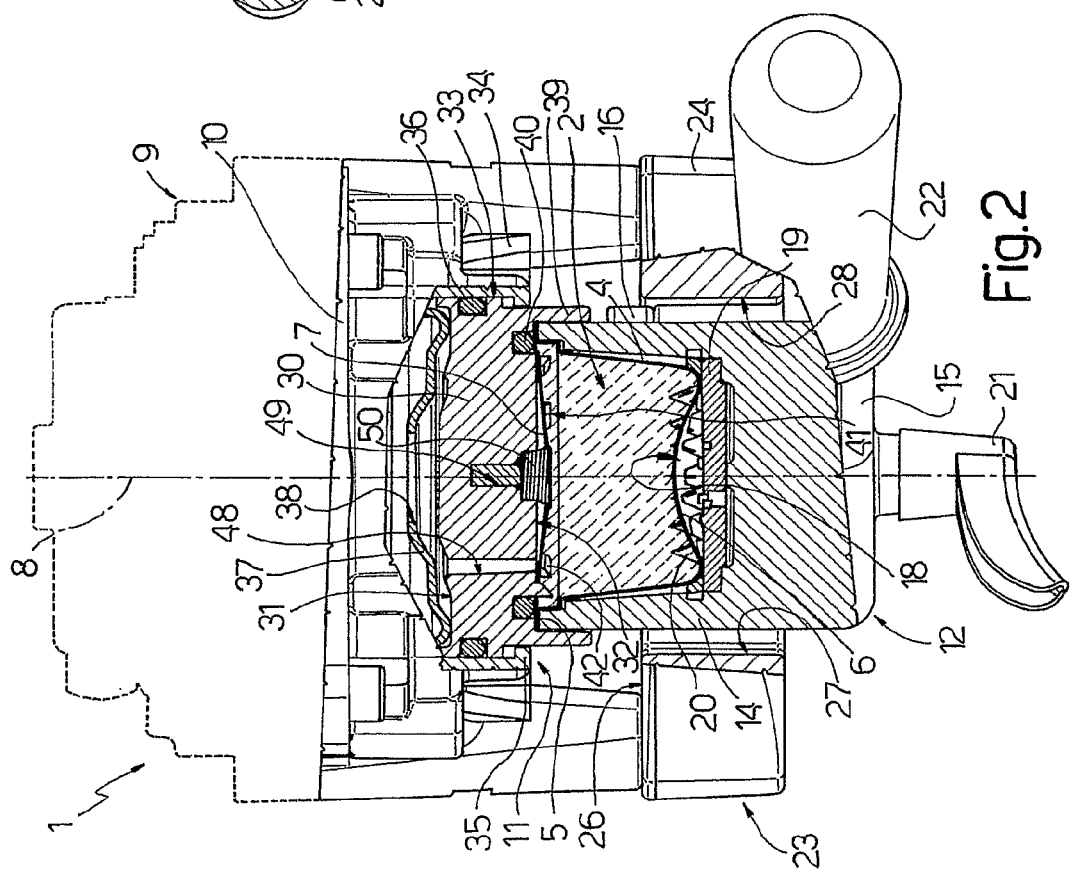

PERCOLATING MACHINE FOR PRODUCING A BEVERAGE USING A SEALED CAPSULE OF ANHYDROUS POWDERED MATERIAL

RELATED APPLICATIONS

The present application is a national phase entry under 35 USC 371 of International Application PCT/EP05/52952 filed on Jun. 23, 2005, which claims priority from Italian application TO2004A000442 filed on Jun. 29, 2004.

TECHNICAL FIELD

The present invention relates to a percolating machine for producing a beverage using a sealed capsule of anhydrous powdered material.

More specifically, the present invention relates to a percolating machine for producing a beverage using a sealed capsule containing anhydrous powdered material and defined by a cup-shaped body closed at one end by a bottom wall and at another end by a sealing wall fitted integrally to the cup-shaped body.

BACKGROUND ART

The machine referred to above is of the type disclosed, for example, in U.S. Pat. No. 5,826,492 and US-A-2003/217644, and comprises pressurized-hot-water dispensing means, in turn comprising a boiler, and a sprinkler having an end wall; a removable percolating cup for housing a sealed capsule of the type described above, and positioned, in use, with its inlet facing the end wall; supporting and retaining means for retaining the percolating cup, in use, in a work position connected to the end wall; a first piercing device carried by the sprinkler to permit pressurized-hot-water flow through the sealing wall; and a second piercing device carried by the percolating cup to permit outflow of the beverage through the bottom wall; the first piercing device comprising a number of projections extending towards the supporting and retaining means from a peripheral portion of the end wall; and the dispensing means, the supporting and retaining means and the percolating cup being aligned, in use, along an axis.

Though the machine according to the present invention is suitable for percolating any type of beverage by feeding pressurized hot water through anhydrous powdered material in a sealed capsule, specific reference is made in the following description, purely by way of example, to a machine for producing a coffee beverage using a sealed capsule containing a respective measure of ground coffee.

Known percolating machines employing sealed capsules of the type described above are normally enclosed machines, in which the piercing devices are only accessible from the outside by removing at least part of the machine, and may be, as is normally the case, needle devices.

In the case, however, of percolating machines of the above type, in which the percolating cup is removable, so that at least the first piercing device is accessible from the outside, using a needle-type first piercing device would be relatively dangerous, particularly when servicing or cleaning the machine.

DISCLOSURE OF INVENTION

It is an object of the present invention to provide a percolating machine of the type described above, designed to ensure maximum user safety during use and, particularly when servicing or cleaning the machine.

According to the present invention, there is provided a percolating machine for producing a beverage using a sealed capsule of anhydrous powdered material, as claimed in claim 1 and, preferably, in any one of the following Claims depending directly or indirectly on claim 1.

BRIEF DESCRIPTION OF THE DRAWINGS

A non-limiting embodiment of the invention will be described by way of example with reference to the accompanying drawings, in which:

FIGS. 2 and 3 show partial axial sections of the FIG. 1 machine in two different operating configurations;

FIG. 5 shows a section along line V-V in FIG. 3;

BEST MODE FOR CARRYING OUT THE INVENTION

Figure 1:
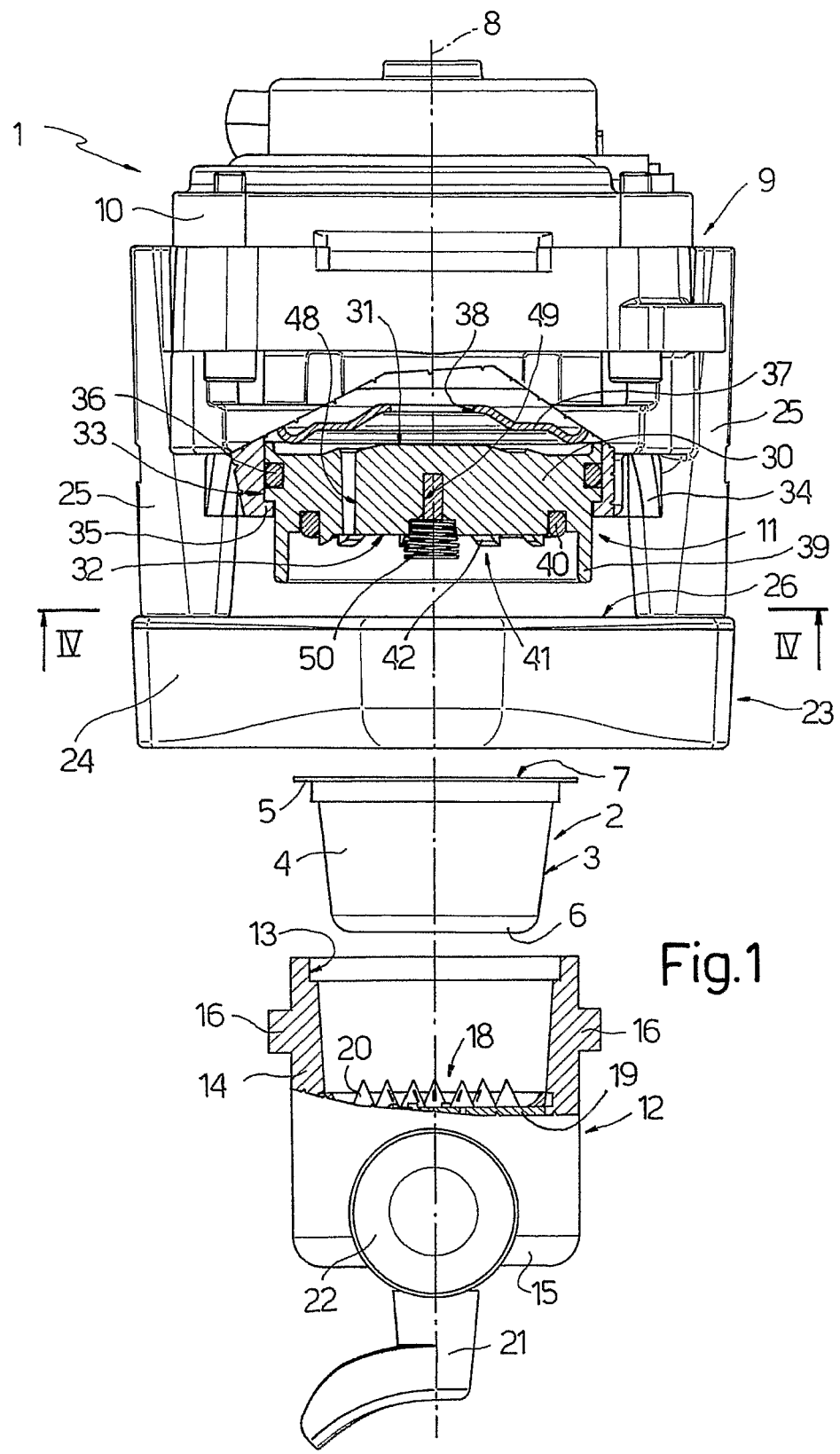
FIG. 1 shows an exploded, partly sectioned side view of a preferred embodiment of the machine according to the present invention.

Number 1 in FIG. 1 indicates as a whole a percolating machine for producing a coffee beverage using a standard sealed capsule 2 containing a measure of ground coffee. In the example shown, capsule 2 comprises a cup-shaped body 3 made of thermoplastic material and having a substantially truncated-cone-shaped lateral wall 4, which has an outer annular flange 5 at its major base, and is closed at its minor base by an inwardly convex bottom wall 6. At the major base of lateral wall 4, cup-shaped body 3 is sealed in fluidtight manner by a sealing wall 7—normally of metal foil—the periphery of which is connected integrally to the outer surface of annular flange 5.

Machine 1 extends along a vertical axis 8, and comprises a pressurized-hot-water dispenser assembly 9, in turn comprising a boiler 10 supplied with pressurized water by a known pump (not shown), and a sprinkler 11 coaxial with axis 8 and connected to, and supplied with pressurized hot water by, boiler 10.

Machine 1 also comprises a removable percolating cup 12 defined by a cup-shaped body having an inlet 13, and in turn defined by a substantially cylindrical lateral wall 14, and by a flat bottom wall 15 opposite inlet 13. Close to inlet 13, lateral wall 14 has two diametrically opposite, radial appendixes 16, which form part of a bayonet joint 17 for locking percolating cup 12 axially and angularly, in use, in a work position in which inlet 13 of percolating cup 12 contacts sprinkler 11.

Figure 3:
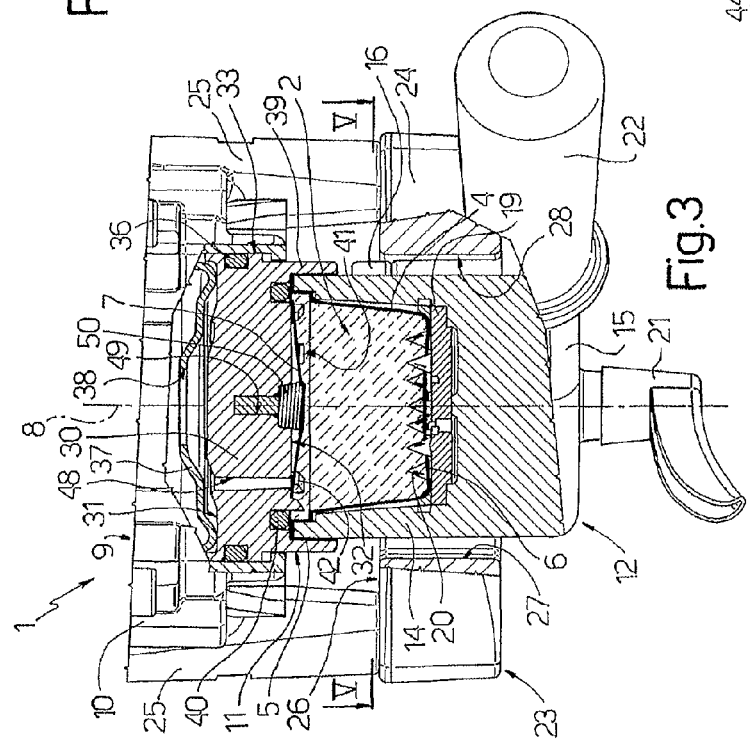

As shown in FIGS. 1 to 3, percolating cup 12 houses a piercing device 18 comprising a plate 19 resting on bottom wall 15, and a number of known hollow extraction needles 20 extending upwards from plate 19 and communicating with a coffee dispensing device 21 by means of a number of through holes formed through plate 19 at needles 20, and a discharge conduit (not shown) formed through bottom wall 15.

Percolating cup 12 also comprises a handle 22 extending radially outwards from lateral wall 14.

Machine 1 also comprises a supporting and retaining device 23 for releasably retaining percolating cup 12, in use, in said work position, and which comprises an annular body 24 fitted, facing sprinkler 11 and coaxial with axis 8, to dispenser assembly 9 by means of two columns 25 extending upwards from a top surface 26, crosswise to axis 8, of annular body 24.

With reference to FIG. 5, annular body 24 has a central cylindrical hole 27 coaxial with axis 8, of a diameter approximately equal to but no smaller than the outside diameter of percolating cup 12, and having two diametrically opposite grooves 28 parallel to axis 8, each open at the top and bottom, and each engaged in transversely sliding manner by a respective appendix 16 of percolating cup 12.

Supporting and retaining device 23 also comprises two pairs of opposite inclined surfaces 29, each pair of which is engaged selectively by appendixes 16 to define, with appendixes 16, bayonet joint 17. Each inclined surface 29 is formed on top surface 26 of annular body 24, along a top edge portion of hole 27 adjacent to a respective groove 28, and communicates at one end with groove 28. Each inclined surface 29 slopes upwards from respective groove 28 towards sprinkler 11, and is closed, at the opposite end to that communicating with relative groove 28, by a radial shoulder defining a stop for relative appendix 16.

As shown in FIGS. 1 to 3, sprinkler 11 is defined by a plate 30 bounded at the top and bottom by respective parallel surfaces 31 and 32 perpendicular to axis 8, and bounded laterally by a substantially cylindrical surface 33 fitted in axially sliding manner to a cylindrical inner surface of a tubular body 34 integral with boiler 10. Sprinkler 11 is movable along tubular body 34, by percolating cup 12, between a lowered rest position (FIG. 1), and a raised work position (FIGS. 2 and 3) in which percolating cup 12 is set to its work position with inlet 13 contacting surface 32. When sprinkler 11 is in its lowered rest position, plate 30 is detached from percolating cup 12 and rests on a flange 35 projecting inwards from a bottom end of tubular body 34. An annular groove is formed in lateral surface 33 of plate 30, and houses an annular seal 36 cooperating in fluidtight manner with the cylindrical inner surface of tubular body 34.

Surface 31 of plate 30 faces a known flexible metal membrane 37, which is interposed between boiler 10 and sprinkler 11, is coaxial with axis 8, has a central opening 38 through which pressurized hot water is fed to sprinkler 11, and in use acts (in known manner) as a hydraulic press for applying axial force on sprinkler 11 towards percolating cup 12.

In a variation not shown, membrane 37 is replaced by a known piston, through which is normally formed a feed conduit extending between an outlet of boiler 10 and sprinkler 11, through a known one-way valve calibrated to open when the pressure upstream from the valve reaches a given value.

Sprinkler 11 also comprises a tubular appendix 39 coaxial with axis 8, extending downwards from the periphery of plate 30, and of an inside diameter approximately equal to but no smaller than the outside diameter of lateral wall 14 of percolating cup 12. An annular groove is formed in surface 32, close to tubular appendix 39, is open at the bottom, is coaxial with axis 8, and houses an annular seal 40.

Figure 4:
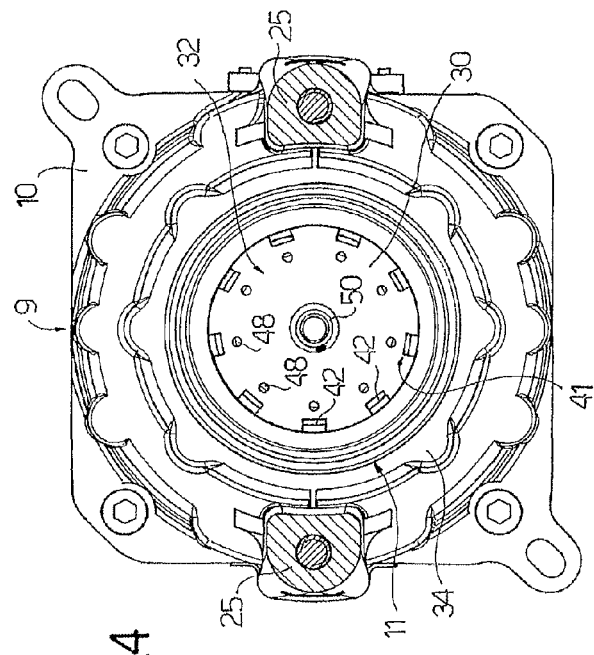
FIG. 4 shows a section along line IV-IV in FIG. 1.

As shown in FIGS. 1 to 3 and in more detail in FIG. 4, sprinkler 11 comprises a piercing device 41, in turn comprising a number of identical, rectangular-based projections 42 integral with plate 30, extending downwards from surface 32, and equally spaced about axis 8 in a circle of a radius smaller than that of seal 40.

Figure 6:
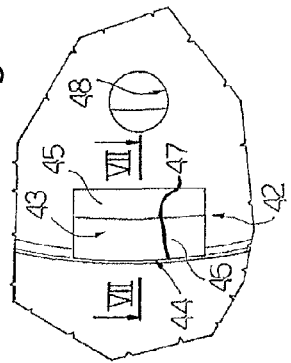
FIG. 6 shows a larger-scale view of a detail in FIG. 4.
Figure 7:
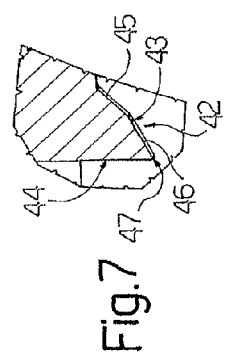
FIG. 7 shows a section along line VII-VII of the FIG. 6 detail.

As shown in FIGS. 6 and 7, each projection 42 has a substantially saw-tooth profile, and is bounded, on the side facing axis 8, by an inclined surface 43, and, on the opposite side facing radially outwards with respect to axis 8, by a cylindrical surface 44 coaxial with axis 8. Inclined surface 43 comprises a base portion 45; and a vertex portion 46, which is connected to cylindrical surface 44 along a cutting edge 47, and slopes at a greater angle than base portion 45 with respect to axis 8.

Sprinkler 11 also comprises a number of pressurized-hot-water outlet holes 48, each of which is located close to a respective projection 42, is adjacent to relative inclined surface 43, and extends, parallel to axis 8, through plate 30.

Sprinkler 11 also comprises a dead hole 49 coaxial with axis 8, open at the bottom, and having, at the open end, a wider portion defining a seat for one end of a cylindrical thrust spring 50, which is coaxial with axis 8 and, at least in an extended rest position, projects from surface 32.

Operation of machine 1 will now be described as of the FIG. 1 operating configuration, in which a capsule 2 is inserted by the user inside percolating cup 12, which is fully detached from the rest of machine 1.

When inserted inside percolating cup 12, capsule 2 is positioned with the periphery of bottom wall 6 substantially contacting plate 19, and with flange 5 resting on the free edge of percolating cup 12.

At this point, moving percolating cup 12 by means of handle 22, the user engages appendixes 16 inside respective grooves 28; when cup 12 is pushed upwards, each appendix 16 slides substantially vertically along respective groove 28, and, when percolating cup 12 is rotated clockwise or anticlockwise, engages and slides along a respective inclined surface 29 until it is brought to a stop against the relative radial shoulder.

In a variation not shown, annular body 24 has only one pair of inclined surfaces 29, so that percolating cup 12 can only be rotated in one direction; whereas the two pairs of inclined surfaces 29 in machine 1 as shown enable the user to rotate handle 22 clockwise or anticlockwise.

As shown in FIG. 2, when rotated as described above, percolating cup 12 is set to the work position, in which the free edge of percolating cup 12 presses flange 5 against seal 40, and, at the same time, sprinkler 11 is moved into the raised work position, spring 50 is pressed against sealing wall 7, and projections 42 penetrate capsule 2.

In connection with the above, it should be pointed out that, given the substantially equal diameters of seal 40 and flange 5, projections 42 pierce sealing wall 7 slightly inwards of flange 5, where sealing wall 7 is substantially rigid flexurally and therefore pierces easily without flexing.

When machine 1 is activated, membrane 27, which, as stated, acts as a hydraulic press, is expanded by the pressurized hot water in known manner, thus pressing sprinkler 11 elastically against percolating cup 12, and so pressing seal 40 in fluidtight manner against flange 5. At the same time, the pressurized hot water flows through central opening 38 in membrane 27 and through holes 48 in sprinkler 11 and the holes in projections 42 into capsule 2, where it spreads evenly to evenly impregnate the ground coffee, and outwardly deforms bottom wall 6, which is thus pierced by needles 20 of piercing device 18 to permit outflow of the coffee.

Once the coffee is produced, machine 1 is deactivated, and percolating cup 12 can be detached to remove the used capsule 2 manually from percolating cup 12. Detachment of the used capsule from sprinkler 11 is assisted by the thrust exerted by spring 50 on the central portion of sealing wall 7. In this connection, it should be pointed out that, if percolating cup 12 is extracted from annular body 24 as soon as the coffee is produced, tubular appendix 39 of sprinkler 11 protects the user against outward spray of any pressurized hot water still inside capsule 2.

The invention claimed is:
1. A percolating machine for producing a beverage using a sealed capsule containing anhydrous powdered material and defined by a cup-shaped body closed at one end by a bottom wall and at another end by a sealing wall fitted integrally to the cup-shaped body; the machine comprising:

a pressurized-hot-water dispenser having an end wall;

a removable percolating cup for housing a said capsule, and positioned, in use, with its inlet facing said end wall;

supporting and retaining means for retaining said percolating cup, in use, in a work position connected to said end wall;

a first piercing device carried by said sprinkler to permit pressurized-hot-water flow through said sealing wall; and a second piercing device carried by said percolating cup to permit outflow of said beverage through said bottom wall;

wherein the dispensing means, the supporting and retaining means and the percolating cup are aligned, in use, along an axis;

wherein said first piercing device comprises a number of projections extending toward said supporting and retaining means from a peripheral portion of said end wall and equally spaced about said axis in a single circle coaxial with said axis and of a diameter approximately equal to but no larger than an inside diameter of said inlet; and wherein each projection of the first piercing device has a substantially rectangular base having a first side facing said axis and a second side facing away from said axis, and a substantially saw-tooth profile having an inclined first surface extending along the first side, and a part-cylindrical second surface coaxial with said axis extending along the second side and intersecting the first surface to define a cutting edge.

2. A machine as claimed in claim 1, wherein said inclined surface of each projection of the first piercing device comprises a base portion and a vertex portion; said vertex portion being connected to said part-cylindrical surface along said cutting edge, and sloping at a greater angle than said base portion with respect to said axis.

3. A machine as claimed in claim 1, wherein said axis is a vertical axis.

4. A machine as claimed in claim 1, wherein said sprinkler is mounted to move axially, when subjected to thrust by said percolating cup and in opposition to the reaction of thrust means, from an extracted position to a withdrawn position towards said boiler.

5. A machine as claimed in claim 1, and comprising a number of pressurized-hot-water outlet conduits formed axially through the end wall of said sprinkler;

said outlet conduits being arranged at a distance from said axis to form a single circle about said axis.

6. A machine as claimed in claim 5, wherein each outlet conduit is associated with a respective projection and adjacent to the relative projection.

7. A machine as claimed in claim 1, wherein said supporting and retaining means comprise an annular body coaxial with said axis; a guide for guiding said percolating cup along said annular body; and a bayonet joint for retaining said percolating cup in said work position.

8. A machine as claimed in claim 7, wherein said supporting and retaining means are releasable.

9. A machine as claimed in claim 7, wherein said guide comprises two straight, diametrically opposite grooves parallel to said axis and formed through said annular body; said percolating cup having two appendixes, each for engaging a respective said groove in transversely sliding manner.

10. A machine as claimed in claim 9, wherein said bayonet joint comprises at least one pair of sloping surfaces; each sloping surface being formed on said annular body, facing said sprinkler, and extending from a respective said groove.

11. A machine as claimed in claim 2, wherein the base portion defines a first planar surface and the vertex portion defines a second planar surface.

\* \* \* \* \*